June 27, 1961 R. L. ROD 2,990,543
SENSING THE PRESENCE OR ABSENCE OF MATERIAL
Filed May 18, 1956
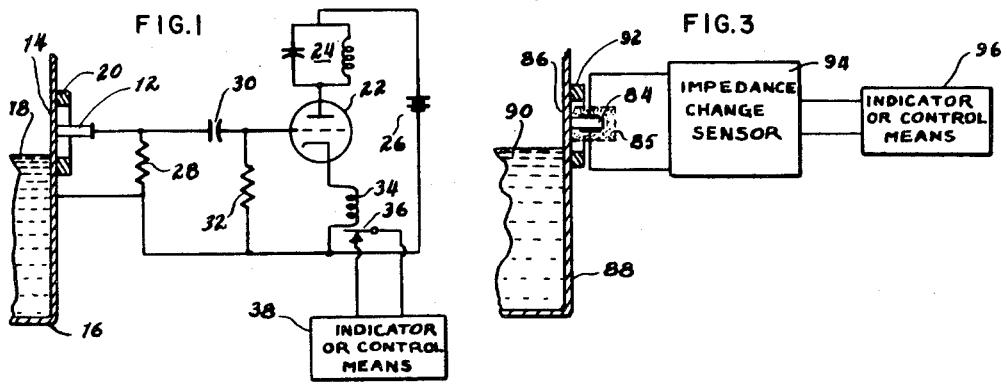
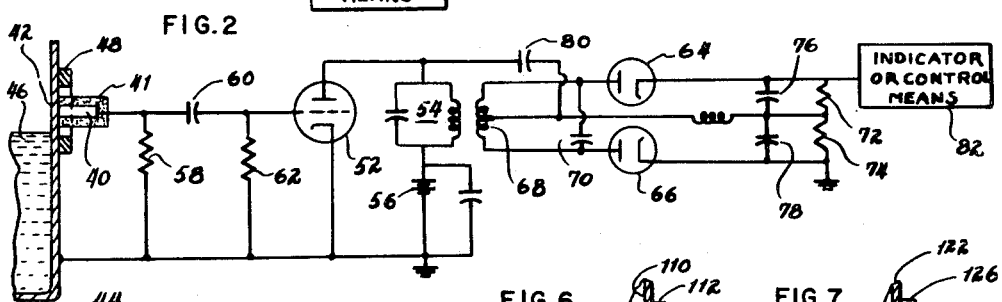
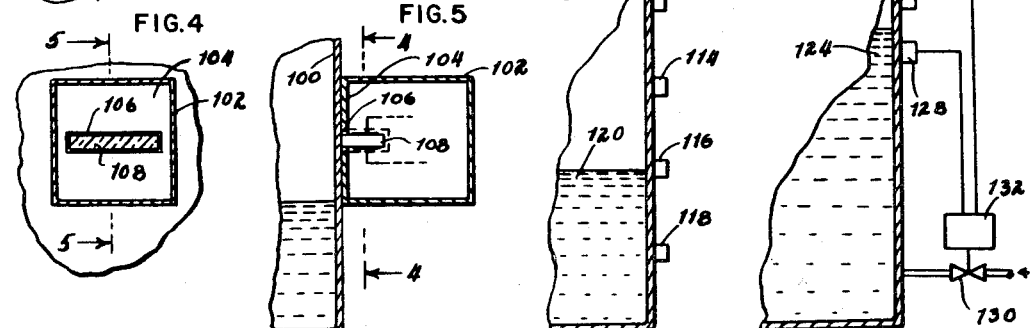
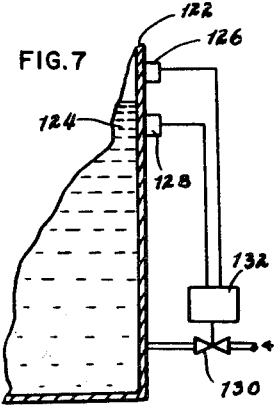
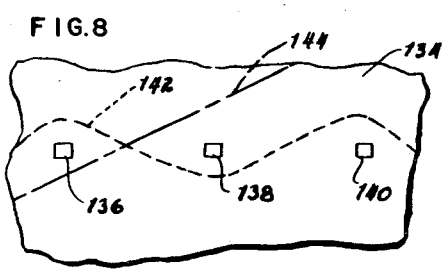
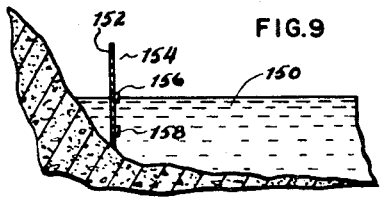
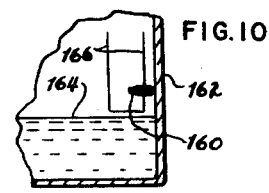
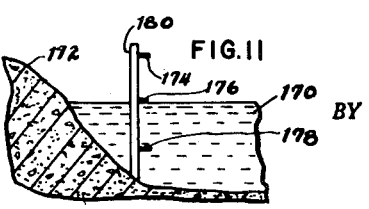
INVENTOR.
ROBERT L. ROD
BY
James and Franklin
ATTORNEYS 2,990,543
Patented June 27, 1961

2,990,543
SENSING THE PRESENCE OR ABSENCE OF MATERIAL

Robert L. Rod, New York, N.Y., assignor to Acoustica Associates, Inc., Long Island City, N.Y., a corporation of New York
Filed May 18, 1956, Ser. No. 585,889
1 Claim. (Cl. 340—244)

This invention relates to the sensing of the presence or absence of material, especially material resting against a wall, and more particularly to the sensing of the level of stored material in a container. The stored material most commonly is a liquid, but may be a solid, particularly when made fluid as when in powdered or granular form.

The primary object of the invention is to provide a method and apparatus for the above stated purpose. A more specific object, in one form of the invention, is to operate wholly outside the container, without requiring any connection or device inside the container. This is done by setting up a vibration of the wall by means of an electroacoustic transducer, and sensing the difference in impedance or/and frequency of the transducer assembly resulting from the presence or absence of material against the wall.

A further object is to improve the accuracy of the response obtained. Still another object is to establish an optimum relation between the frequency of vibration and the thickness and material of the wall. Other objects are to apply the aforesaid system to measurement of level, to maintenance of level, and to the detection of sloshing or tilting.

To accomplish the foregoing general objects, and other more specific objects which will hereinafter appear, my invention resides in the apparatus elements, and their relation one to another, as are hereinafter more particularly described in the following specification. The specification is accompanied by drawings, in which:

FIG. 1 schematically represents one form of apparatus embodying features of my invention;

FIG. 2 discloses a modification;

FIG. 3 schematically represents still another modification;

FIG. 4 is a section through a housing, taken approximately in the plane of the line 4—4 of FIG. 5;

FIG. 5 is another section through the housing, taken approximately in the plane of the line 5—5 of FIG. 4;

FIG. 6 is explanatory of apparatus used for level measurement;

FIG. 7 is explanatory of apparatus used for level maintenance;

FIG. 8 is explanatory of apparatus used to detect sloshing or tilting;

FIG. 9 shows how the invention may be used to measure liquid level in an open reservoir, lake, or river, etc.;

FIG. 10 is explanatory of a modified way to use an electroacoustic transducer; and FIG. 11 shows the application of the same to an open body of material.

In one form the system may be termed an "ultrasonic knucklerapper," which raps on the wall of a tank to determine the presence or absence of a liquid or solid on the other side. The device operates on acoustic principles as follows:

An electroacoustic transducer, preferably, but not limited to, a piezo-electric device in the form of a small bar with thin rectangular cross-section, is attached with one surface cemented or otherwise secured to the outer surface of the tank or container wall. A small rectangular area of the tank wall surrounding the crystal preferably is outlined by a relatively heavy rectangular reinforcing frame, so that the vibrations of the wall set up by the transducer are confined to this area. The area of the wall so outlined vibrates like a drumhead in synchronism with the electroacoustic transducer. Vibrations are produced by coupling the electroacoustic transducer to a suitable source of high frequency alternating current.

If such a vibrating sensing element is located above the level of liquid or solid material in the tank, it is a high-Q (low damping) resonant system. The only possible losses of power in vibrating are very small. They are the dynamic losses in the electroacoustic transducer and in the tank wall section which is vibrating as a drumhead, and the insignificant acoustic radiation losses to the air or vapor above the surface within the tank. However, if the material covers the position of the sensing element on the tank wall, the acoustic radiation losses are very much larger. This results from the marked difference in the ability of a mechanical vibrator to radiate power into a liquid (or solid) and into a vapor. Therefore, when the sensing element is covered by a liquid or solid material, the system becomes a low-Q resonant system.

The detection of this change in the Q factor can be accomplished by several means, the most convenient of which is to use the transducer as the resonant element in a standard crystal oscillator. The transducer is connected across the grid circuit of an oscillator tube (or equivalent transistor emitter), and oscillations take place at a frequency determined by the resonant frequency of the system. However, the anode current (both A.C. and D.C.) is very sensitive to the losses in the transducer, which appear in the equivalent electrical circuit as a damping resistor in the grid circuit. Therefore, the change between conditions with and without material covering the drumhead area causes a marked change in the anode current, which can be detected by any of a number of different conventional means, some of which are next referred to.

Referring to FIG. 1 of the drawing, the apparatus comprises an electroacoustic transducer 12 mounted on the wall 14 of a tank 16 containing liquid 18. A part of the wall is framed, as indicated at 20. The transducer is vibrated by an oscillator which, in the present case, comprises a vacuum tube 22, tank circuit 24, "B" battery 26, and an input circuit including a coupling resistor 28, a coupling capacitor 30, and a bias resistor 32. The apparatus further comprises means to sense the difference in impedance or/and frequency of the transducer assembly resulting from the presence or absence of liquid 18 against the framed wall portion 14. By transducer assembly I mean the transducer 12 with its connected wall area 14. In the present case the anode current flows through a sensitive relay 34 having a movable contact 36 controlling an indicator or/and control means 38, which may be located remotely. One may think of the transducer as an impedance which becomes low and heavily damps the oscillator circuit, or one may think of the transducer as changing natural frequency and so differing from the resonant frequency of the tank circuit 24. In any case there results an abrupt change in anode current, and relay 34 is responsive to that change.

Another means for sensing the presence or absence of a liquid or solid in the drumhead region is to measure the shift in oscillator frequency which occurs if the various parameters in the resonant system are properly selected.

This is illustrated in FIG. 2 of the drawing, in which transducer 40 is secured to the framed portion 42 of the wall of a tank 44 containing liquid 46. The wall portion 42 is framed at 48. As before, the surfaces of transducer 40 other than that secured to wall 42 are dynamically free, but preferably are secured against static and low frequency inertial loads by the use of "pressure-release"

supporting materials such as rubber, neoprene or "corprene," in the manner commonly used in electroacoustic transducer design. This is indicated at 41.

The transducer forms a part of the input circuit of an oscillator similar to that previously described, in comprising a tube 52, a tank circuit 54, "B" battery 56, a coupling resistor 58, a coupling capacitor 60, and a grid bias resistor 62. The tank circuit is coupled to a frequency discriminator circuit which may be conventional, and which in the present case, comprises diodes 64 and 66, symmetrically coupled to tank circuit 54 by means of a divided coupling coil or transformer secondary 68, which may be tuned by a capacitor 70. The output is taken across resistors 72 and 74, shunted by capacitors 76 and 78. There is an additional coupling capacitor 80 between tank circuit 54 and the discriminator circuit.

Because of the phase relationships between the primary and each half of the secondary 68, each half of the secondary being connected in series with the primary through the capacitor 80, the voltages applied to the diodes 64 and 66 become unequal as the signal or input swings away from the resonant frequency in either direction. As the swing occurs, the voltages developed across the diode load resistors 72 and 74 connected in series similarly change. The output voltage depends on the difference in amplitude of the voltages developed across resistors 72 and 74. These voltages are equal and of opposite sign when the oscillator frequency is unchanged, and the output therefore may be balanced to zero, for either the absence or the presence of liquid at the wall portion 42. Then in the opposite situation there is a distinct unbalance, producing an output which may be used to operate an indicator or control means 82.

Another sensing method is to measure the difference in the coupled electro-mechanical impedance of the transducer. This is schematically illustrated in FIG. 3 of the drawing, in which the electroacoustic transducer 84 is secured to a portion 86 of a tank wall 88 carrying a liquid 90. The wall portion 86 may be framed, as indicated at 92. In this case the electrodes of the transducer are on opposite free surfaces, instead of using the tank wall as one of the electrodes. The transducer again may be embedded in "pressure-release" supporting material 85.

The transducer 84 is connected to an impedance change sensor 94, and this in turn is connected to a suitable indicator or control means 96, which may be located remotely from the transducer. The impedance change sensor housed in rectangle 94 may be a conventional impedance bridge, or any other known form of impedance measuring or impedance responsive device.

While a piezo electric transducer has been mentioned as the preferred electroacoustic transducer, ferroceramic, magnetostriction, electrostatic, and electro dynamic transducers may also be used alternatively.

For operating convenience it is preferable to select a vibration frequency which is suitably related to the tank wall thickness and the velocity of sound through the tank wall. For optimum results, the wall thickness at the operating or resonance frequency of the system should be one half-wavelength in thickness, or a multiple of one half-wavelength. The "loading" effects on the transducer then are most pronounced.

By suitably designing or modifying the circuitry on relays, the response of the system to a rise in level to the drumhead area can be made either rapid or slow, as need be, the slow response being useful when it is desired to average out sloshing conditions.

From a mechanical standpoint, the device can be made entirely self-contained within a small box or case affixed to the outside of the tank wall. A flange along the base perimeter of the case may be used as the stiffener frame previously referred to as confining the vibrations to a relatively small area in order to improve the definition or accuracy of the system.

This is illustrated in FIGS. 4 and 5 of the drawing, showing how tank wall 100 may have a housing 102 secured thereto. This is an enclosed housing, one wall 104 of which is horizontally slotted at 106. The slotted wall 104 acts as a means to frame the area defined within the slot 106, and to this exposed or "windowed" area the transducer 108 is secured. The housing 102 may contain the circuitry, and where exceeding compactness or miniaturization is required, a transistor may be used in lieu of a vacuum tube.

Some methods of using the invention may be described with reference to FIGS. 6 through 9 of the drawing. In FIG. 6 a series of units are spaced one above the other on a tank wall 110, as is indicated at 112, 114, 116, and 118. These units may be like that described in connection with FIGS. 4 and 5, each including a transducer and oscillator. Conductors (not shown) lead from the units to a suitable indicator system, which may be located remotely, and by examining the indicators one can determine the height of liquid 120 in tank 110, in a series of steps defined by the spacing of the units.

Referring now to FIG. 7, in this case a tank 122 is to be kept filled with liquid 124 at a predetermined level. A pair of units 126 and 128 are disposed above and below the desired level, and are connected by suitable conductors to a supply valve 130 controlled by a suitable valve control means 132. The arrangement is such that when the liquid level is below unit 128 liquid is admitted until the level reaches the unit 126, whereupon the supply is stopped.

A single unit may be used at the desired level, this serving to shut off the supply when liquid is present, and to resume supply when liquid is not present. If a substantial change in level can be tolerated, the arrangement shown in FIG. 7 has the advantage that the valve will operate at longer intervals.

In FIG. 8 the tank wall 134 is provided with a plurality of units 136, 138 and 140 disposed in horizontal relation. Such units may be used to detect sloshing or agitation of liquid in a tank, this being indicated by the broken line 142. It will be evident that some units will have liquid present and others not. In the present case there is liquid present at units 136 and 140, and not at unit 138. A moment later the situation may be reversed. Thus the sloshing may be shown at any suitable indicator or alarm device, which may be remote from the tank.

A similar array of horizontally disposed units may be used to detect a change in horizontality of a tank. Thus if the liquid surface is disposed at an angle, as is indicated by the dot and dash line 144, there will be liquid present at some units and not at others, in a quiescent or steady state, and this may be used as an indication that the tank has been tilted, and may be differentiated from the active wave condition shown at 142.

As so far described the measurement has referred to liquid confined in a tank, and the wall has been the tank wall. However, this is not essential. For example, referring to FIG. 9 I show an open body of water 150 such as a lake, reservoir or river. A plate 152 is immersed in the liquid, and carries a series of units 154, 156, 158. The loading of liquid against the plate 152 will produce a change in impedance or/and frequency, as previously described, except that here there is liquid on both sides of the plate 152.

It is not essential, even when dealing with material in a tank, that the transducer be disposed outside the tank, although the ability to work wholly outside the tank is one of the important advantages of the present improvement. As an obvious example, the plate 152 in FIG. 9 may be put inside the tank. Referring to FIG. 10, I there show a transducer 160 mounted directly on the inside of a wall 162 of a tank containing liquid 164. Conductors 166 lead to electrodes on the transducer, and the surface of the device may be coated with a film of suitable insulating material to protect it against the liquid 164. When the transducer is surrounded by liquid its vibration is damped.

In this particular form of the invention the response may be made relatively independent of vibration of the tank wall. For that purpose a transducer which vibrates by bending (that is, in cantilever) is preferable. A commercial example is the "Bimorph" made by The Brush Development Corporation of Cleveland, Ohio. It is made of two slabs cemented together and having dissimilar expansion characteristics, thus causing bending. The bending vibration is damped by the surrounding material 164 when the level rises. In this case wall 162 may be quite thick and rigid.

Referring now to FIG. 11, the height of liquid 170 in an outdoor reservoir, lake, or river, etc. 172, may be measured by a series of transducers 174, 176, 178 mounted for bending or cantilever vibration. They may be mounted on a rigid post 180, and no vibratile plate or wall is required. Similarly a post may be used in the tank of FIG. 10, for example, at the center of the tank.

When vibrating a tank wall, the accuracy is lower with a thicker wall. Also a lower frequency should be used with a thicker wall and a higher frequency with a thinner wall. However, it is not well to define frequency solely with reference to thickness, because another factor is the material of which the wall is made. It is for this reason that I prefer to speak in terms of wavelength, and the wall thickness is to be half-wavelength (or a multiple of one half-wavelength), for the velocity of propagation may vary with the material. A relation based on wavelength inherently allows for differences of material.

When the liquid or solid substance reaches the transducer it loads it, and changes the natural frequency of the assembly, as already described. The frequency is lower when loaded, and higher when not, provided that the wall thickness is a half-wavelength (or multiple thereof).

In one example of the invention the wall thickness is less than a fiftieth of an inch, and the frequency is in the order of megacycles. By using a transistor instead of a vacuum tube, the entire circuit shown in FIG. 1, including the battery cell, may be housed within a cube as small as one inch on edge. The window for the crystal may be 1/8" high (for accuracy) and 1" wide, and to stiffen the tank wall around the window, the face of the cube may itself be used, it being flanged downward from above and upward from below, as already described. The crystal may be disposed edgewise to best fit the horizontally elongated window.

It is believed that the construction, theory, and operation of my improvement, as well as the advantages thereof, will be apparent from the foregoing detailed description. It will be understood that while I have referred often to liquid level, the material may be solid instead of liquid, particularly when in granular form so that it is fluid.

It will be understood that the end electrode connection of FIGS. 1 and 2 may be used in FIGS. 3 and 5 in lieu of the side electrode connection there shown, and that, conversely, the side electrode connection of FIGS. 1 and 2. The pressure release material shown in FIGS. 2 and 3 may be used in FIGS. 1, 4 and 5, although not there shown, and, conversely, the pressure release material shown in FIGS. 2 and 3 may be omitted if desired. The housing shown in FIGS. 4 and 5 which acts also as a frame may be used in FIGS. 1, 2 and 3 in lieu of the separate frame there shown. The immersed diaphragm arrangement of FIG. 9 may be used in a storage tank, and similarly the immersed post support of FIG. 11 may be used in a storage tank, these forms of the invention not being limited to outdoor or natural bodies of liquid.

It therefore will be apparent that while I have shown and described my invention in several preferred forms, changes may be made in the structures shown, without departing from the scope of the invention, as sought to be defined in the following claims. In the claims the term "electroacoustic transducer" is intended to be generic to devices which change electrical to mechanical energy, and vice versa, at sonic and ultrasonic vibration frequencies. It is intended to include piezoelectric, ferroceramic, magnetostriction, electrostatic, and electrodynamic transducers. In the claims the expression "free to vibrate" is not meant to exclude the use of "pressure release" supporting materials, mentioned above.

I claim:

Apparatus for sensing the level of stored fluid material in a container, said apparatus comprising an enclosed housing one wall of which is horizontally slotted, means securing said slotted wall against a wall of the container to frame a narrow strip of container wall, an electromechanical transducer secured to the container wall through the aforesaid slot and free to vibrate within the housing, circuitry including electrical conductors leading to said transducer to vibrate the same at a desired frequency, and additional means connected to said same conductors and circuitry to sense the difference in an operating characteristic of the said transducer assembly resulting from the presence of said fluid material at the predetermined level as compared with said characteristic when said material is not present at said level.

References Cited in the file of this patent

UNITED STATES PATENTS

| | | |
|---|---|---|
| 1,789,369 | Meissner | Jan. 20, 1931 |
| 2,105,479 | Hayes | Jan. 18, 1938 |
| 2,484,623 | Heising | Oct. 11, 1949 |
| 2,704,455 | Duhamel, et al. | Mar. 22, 1955 |
| 2,711,646 | Mendousse | June 28, 1955 |
| 2,787,160 | Van Valkenburg | Apr. 2, 1957 |
| 2,808,581 | Findlay | Oct. 1, 1957 |

UNITED STATES PATENT OFFICE
CERTIFICATION OF CORRECTION

Patent No. 2,990,543                                June 27, 1961

Robert L. Rod

It is hereby certified that error appears in the above numbered patent requiring correction and that the said Letters Patent should read as corrected below.

Column 6, line 2, after "FIGS." insert -- 3 and 5 may be used in lieu of the end connection shown in FIGS. --.

Signed and sealed this 3rd day of April 1962.

(SEAL)
Attest:

ERNEST W. SWIDER                              DAVID L. LADD
Attesting Officer                                  Commissioner of Patents